United States Patent [19]

Saji

[11] Patent Number: 5,479,486
[45] Date of Patent: Dec. 26, 1995

[54] CORDLESS TELEPHONE SET HAVING A WARNING SIGNAL REPRESENTING THAT A STORAGE BATTERY IS NOT BEING CHARGED

[75] Inventor: Mitsuroh Saji, Kyoto, Japan

[73] Assignee: Rohm Co., Ltd., Kyoto, Japan

[21] Appl. No.: 212,713

[22] Filed: Mar. 14, 1994

[30] Foreign Application Priority Data

Mar. 15, 1993 [JP] Japan .................... 5-053317

[51] Int. Cl.⁶ .................................................. H04Q 7/00
[52] U.S. Cl. .................. 379/61; 307/11; 320/64
[58] Field of Search .................. 307/11; 320/2;
379/38, 58, 61, 62; 455/34.1, 54.1, 73, 343

[56] References Cited

U.S. PATENT DOCUMENTS

| 3,740,569 | 6/1973 | Carcia | 307/11 |
| 4,259,548 | 3/1981 | Faher et al. | 379/38 |
| 4,451,774 | 5/1984 | Akira et al. | 320/64 |

FOREIGN PATENT DOCUMENTS

| 3407734 | 9/1985 | Germany | 379/61 |
| 0235538 | 11/1985 | Japan | 379/61 |
| 2159372 | 11/1985 | United Kingdom | 379/61 |

Primary Examiner—Curtis Kuntz
Assistant Examiner—William Cumming
Attorney, Agent, or Firm—Nikaido, Marmelstein, Murray & Oram

[57] ABSTRACT

When the contacts are electrically disconnected under a condition where a handset is set in a concave of a charging stand, the output of a connection condition detecting circuit is of low level. Then, an inverted output thereof, that is, a high-level output is provided through an inverter to one input terminal of an AND circuit, and a switch is closed by the weight of the handset, so that a high-level output is provided also to the other input terminal of the AND circuit. Then, a logical product output of the AND circuit is of high level. As a result, a warning buzzer generates a warning sound to attract the user's attention.

9 Claims, 4 Drawing Sheets

5,479,486

CORDLESS TELEPHONE SET HAVING A WARNING SIGNAL REPRESENTING THAT A STORAGE BATTERY IS NOT BEING CHARGED

BACKGROUND OF THE INVENTION

1. Field of the Invention

The present invention relates to a cordless telephone set including a cordless handset provided with various functions such as the transmitting and receiving functions necessary for telephone apparatuses, and a charger for charging a storage battery incorporated in the cordless handset.

2. Description of the Prior Art

For example, an extension telephone set comprises a main telephone apparatus connected to the telephone lines and one or a plurality of sub telephone apparatuses connected to the main telephone apparatus. In recent years, cordless telephone sets have rapidly been spreading in which the sub telephone apparatus is connected to the main telephone apparatus by wireless to make the sub telephone apparatus more convenient.

A conventional cordless telephone set used for this purpose comprises, as shown in FIG. 1, a cordless handset 31 serving as a telephone apparatus, and a stand-type charging apparatus 32 (hereinafter referred to as charging stand). Taking up the handset 31 from the charging stand 32, the user can make a telephone call at any place without any restriction by the cord. When the handset 31 is set in its position, that is, in a concave 33 of the charging stand 32 after the telephone call, the charging of a storage battery incorporated in the handset 31 is started.

The charging stand 32 normally has an indicator 34 constituted by a light emitting diode (LED) at a position such as an upper front portion which is easily viewed by the user. The indicator 34 is turned on when the handset 31 is correctly set in the charging stand 32, thereby notifying the user that the charging is being performed.

FIG. 2 shows an example of an electrical arrangement for charging the storage battery of the handset 31 in the conventional cordless telephone set provided with the above-described function. Contacts $c_1$ and $c_2$ to be connected to the electrodes of a storage battery 25 are provided at the bottom of the handset 31. Contacts $d_1$ and $d_2$ are provided at the bottom of the concave 33 in which the handset 31 is set. The indicator 34, a resistor 36 and a charging power supply 37 are provided for the charging stand 32.

In this conventional arrangement, when the handset 31 is set in the concave 33 of the charging stand 32, if the contacts $c_1$ and $d_1$ and the contacts $c_2$ and $d_2$ are correctly connected, a closed loop of from the power supply 37 through the storage battery 35, the resistor 36 and the indicator 34 to the power supply 37 is formed, so that the charging current of the storage battery 35 flows to the indicator 34 to turn it on. In this case, if a battery of a type where the current continues to flow after the battery is completely charged is used, the indicator 34 will continue to be on as far as the contacts $c_1$ and $d_1$ and the contacts $c_2$ and $d_2$ are connected.

FIG. 3 shows another conventional arrangement, in which a closed loop consisting of the same elements as the above-described arrangement except the indicator 34 is formed when the contacts $c_1$ and $d_1$ and the contacts $c_2$ and $d_2$ are connected, and a circuit 38 which detects a voltage change between the contacts $d_1$ and $d_2$ is further provided. The detecting circuit 38 detects that the voltage after the contacts $c_1$ and $d_1$ and the contacts $c_2$ and $d_2$ are electrically connected is lower than the voltage before the connection, that is, the supply voltage. The circuit 38 also drives a separately-provided indicator driving circuit 39 with the detection signal as a trigger.

In this arrangement, when the contacts $c_1$ and $d_1$ and the contacts $c_2$ and $d_2$ are electrically connected, the driving circuit 39 drives the indicator 34 to be continuously on, and when the contacts $c_1$ and $d_1$ and the contacts $c_2$ and $d_2$ are electrically disconnected, the driving circuit 39 is disabled, so that the indicator 34 is turned off.

In the above-described conventional arrangements, when the user sets the cordless handset 31 in the charging stand 32, the indicator 34 is turned on only when the contacts $c_1$ and $d_1$ and the contacts $c_2$ and $d_2$ are electrically connected, thereby notifying the user that the storage battery 35 is being charged.

In the above-described conventional arrangements, however, the indicator 34 is not turned on in the following two cases: when the handset 31 is not set in the charging stand 32; and when although the handset 31 is set in the charging stand 32, the contacts $c_1$ and $d_1$ and the contacts $c_2$ and $d_2$ are not electrically connected because they are not connected in good condition.

The latter case further includes the following two cases: when the contacts $c_1$ and $d_1$ and the contacts $c_2$ and $d_2$ are mechanically separated because the handset 31 is not set in a correct manner; and when although the handset 31 is correctly set and the contacts $c_1$ and $d_1$ and the contacts $c_2$ and $d_2$ are in contact with each other in a correct manner, the contacts are electrically disconnected since they are rusty.

Of the above cases where the indicator 34 is not turned on, the former case where the handset 31 is not set in the charging stand 32 corresponds to cases such as when the user is using the telephone and when the handset 31 is being cleaned. In these cases, it does not matter that the indicator 34 is turned off. However, the latter case is considered as a case where the user has not noticed that the indicator is off.

In the conventional arrangements, when the latter case occurs, the charging of the storage battery 35 is not performed although the handset 31 is set in the charging stand 32, and consequently, a telephone call may abruptly be interrupted the next time the user uses the telephone.

This problem may be solved if the user confirms the turning on of the indicator 34 when setting the handset 31 in the charging stand 32. However, various data have revealed the fact that most of the users do not confirm the turning on of the indicator 34. This is attributed to the fact that the light source of the LED used as the indicator 34 is so small that seeing if it is on is difficult in the bright sunlight.

To cope with this problem, the use of a large-light-quantity light emitting part as the indicator 34 and the use of a sound generating part such as a buzzer instead of the indicator are considered. However, in the above-described conventional arrangements, when the handset 31 is separated from the charging stand 32, the large-light-quantity indicator will continue to be on or the sound generating part will continue to generate a warning sound.

SUMMARY OF THE INVENTION

An object of the present invention is to provide a cordless telephone set having a function to provide warning when charging is not being performed although the telephone apparatus is set in the charging apparatus, said warning function not working when the telephone apparatus is separated from the charging apparatus.

A cordless telephone set to which the present invention is directed is provided with a cordless telephone apparatus and a charging apparatus, wherein a contact provided at a predetermined portion of the charging apparatus and a contact provided at a set portion of the telephone apparatus are electrically connected when the telephone apparatus is set in a predetermined portion of the charging apparatus, and charging of a storage battery incorporated in the telephone apparatus is started.

To achieve the above-mentioned object in such a cordless telephone set, according to the present invention, the charging apparatus is provided with setting detecting means for detecting whether the telephone apparatus is set in the predetermined portion of the charging apparatus or not, connection condition detecting means for detecting whether the contact of the charging apparatus and the contact of the telephone apparatus are electrically connected or not, charging detecting means for detecting whether the charging of the storage battery is being performed or not, said detection by the charging detecting means being performed based on a detection output of the setting detecting means and a detection output of the connection condition detecting means, means for outputting a warning signal when a signal for detecting that the charging of the storage battery is not being performed is outputted by the charging detecting means, and warning providing means driven by the warning signal.

According to such a feature, when the setting detecting means detects that the telephone apparatus is set in the predetermined portion of the charging apparatus and the connection condition detecting means detects that the contact of the charging apparatus and the contact of the telephone apparatus are not electrically connected, a warning is provided to the warning providing means.

As described above, according to the present invention, since a function is provided to detect whether the telephone apparatus is set in the predetermined position of the charging apparatus or not and since only when the telephone apparatus is set, the connection condition detecting means detects that the charging of the storage battery is not being performed, warning is provided only when warning is necessary to attract the user's attention. As a result, unexpected accidents such as the abrupt interruption of a telephone call due to the voltage decrease of the storage battery are prevented.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
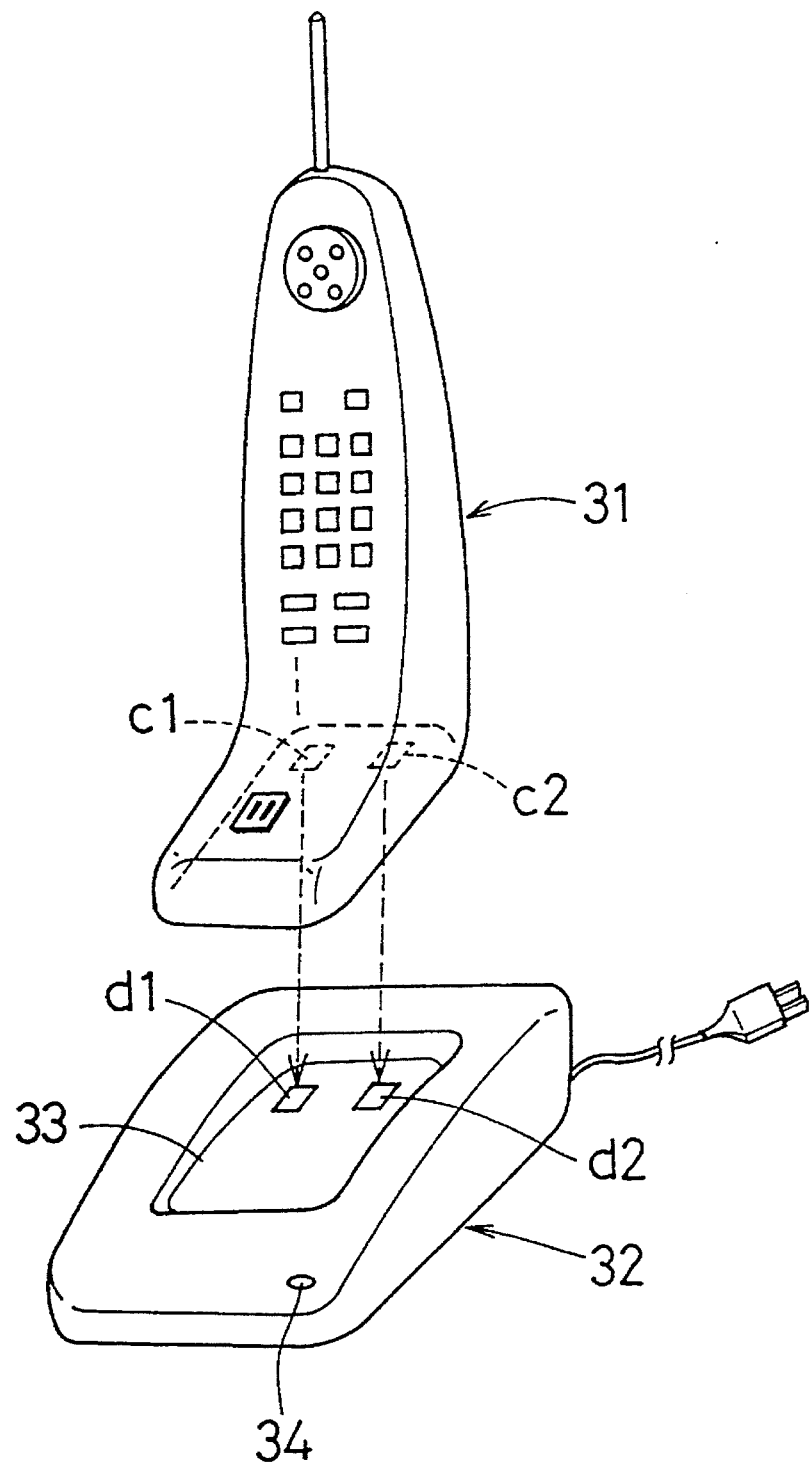
FIG. 1 is a perspective view showing a handset and a charging stand of a conventional cordless telephone set.
Figure 2:
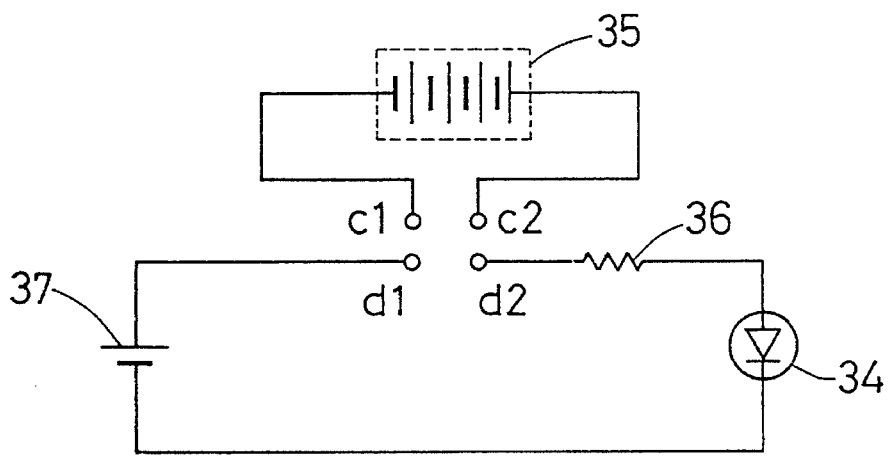
FIG. 2 is a circuit diagram showing an example of an electrical arrangement relating to an indicator of the conventional cordless telephone set.
Figure 3:
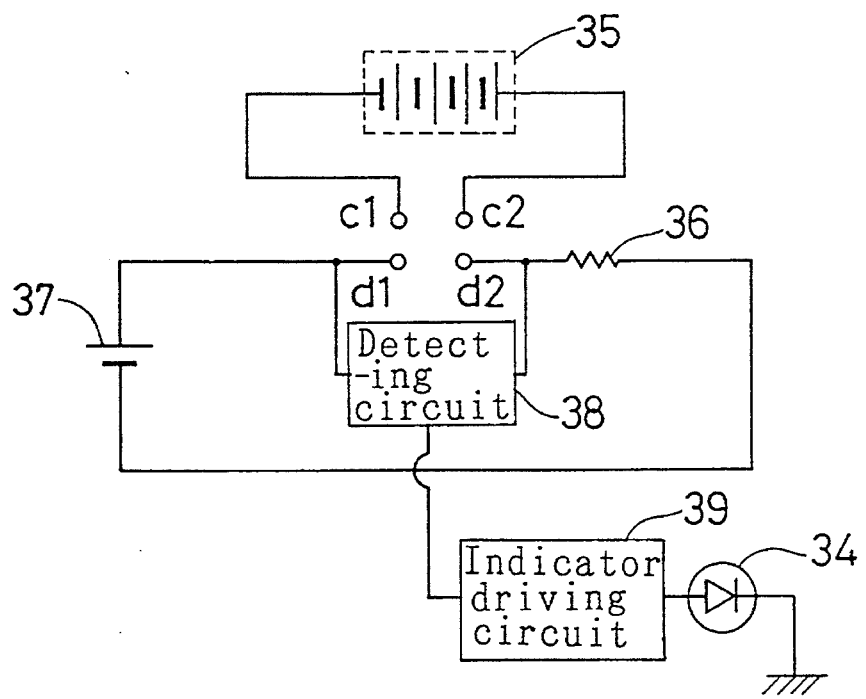
FIG. 3 is a circuit diagram showing another example of an electrical arrangement relating to an indicator of the conventional cordless telephone set.
Figure 4:
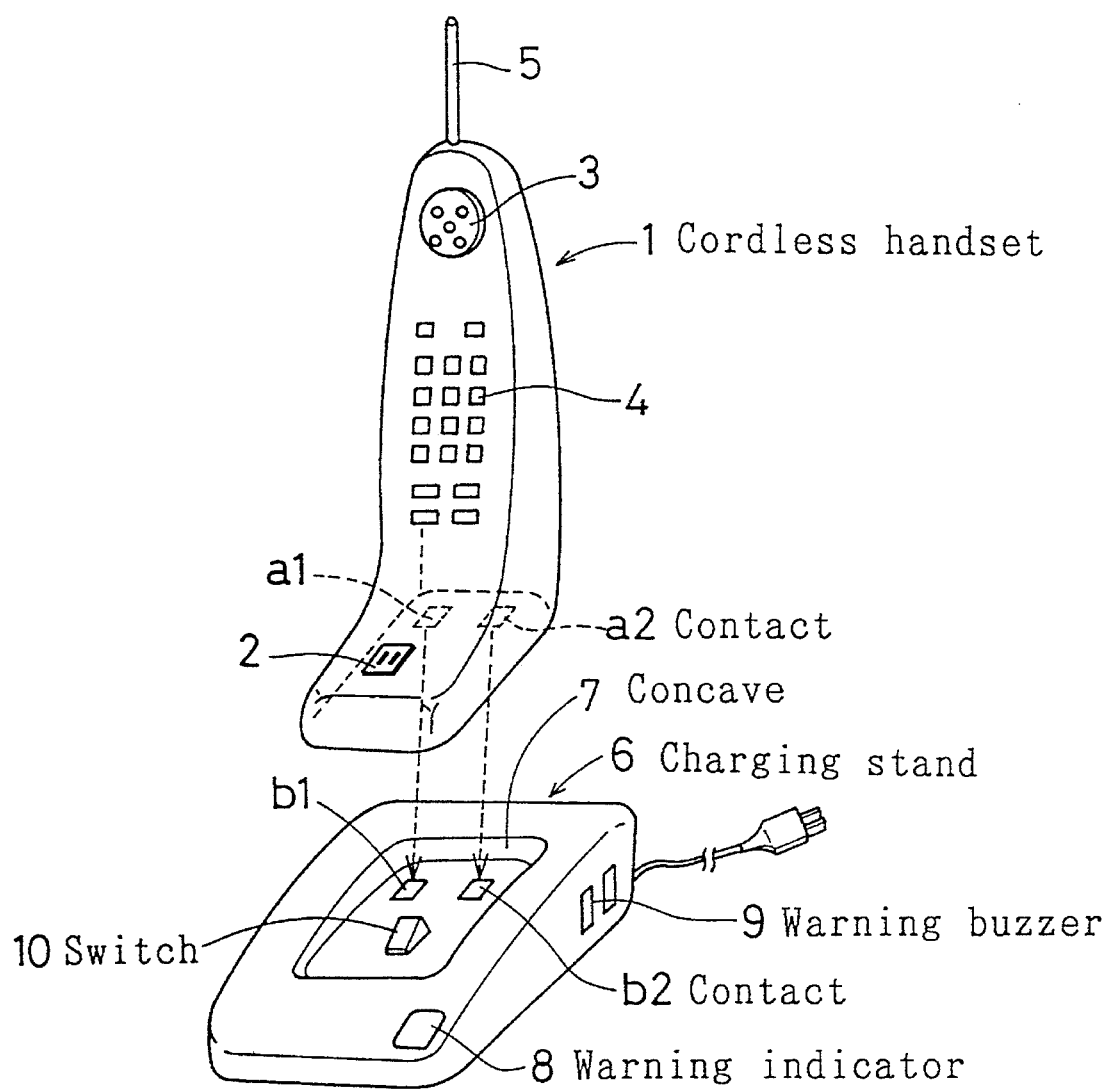
FIG. 4 is a perspective view showing a handset and a charging stand of a cordless telephone set embodying the present invention.

FIG. 4 shows an embodiment of the present invention where the present invention is embodied in a cordless telephone set provided with a stand-type charger. Reference numeral 1 represents a cordless handset serving as a cordless telephone apparatus. The cordless handset 1 incorporates a transmitting microphone 2, a receiving speaker 3, operation buttons 4 for inputting telephone numbers, a communication antenna 5, a control microcomputer (not shown) and a storage battery (not shown) serving as a driving power source.

Reference numeral 6 represents a charging stand serving as a charging apparatus provided separately from the handset 1. At the center of the upper surface of the charging stand 6, a concave 7 in which the handset 1 is to be set is formed. Reference numeral 8 represents a warning indicator serving as a warning providing means constituted by an LED. The indicator 8 is arranged at an upper front portion of the charging stand 6. Reference numeral 9 represents a warning buzzer serving as another warning providing means. The buzzer 9 is arranged at a side portion of the charging stand 6.

The handset 1 is set in the concave 7 of the charging stand 6 so that its bottom is fitted in the concave 7. At the bottom of the handset 1 which comes into contact with the bottom of the concave 7, contacts a1 and a2 constituted by metallic electrodes connected to two electrodes of the storage battery are provided. At the bottom of the concave 7 of the charging stand 6, contacts b1 and b2 are provided at positions corresponding to the contacts a1 and a2 so as to come into contact with them.

Moreover, a switch 10 which projects from and retracts into the bottom of the concave 7 is provided at the bottom of the concave 7 of the charging stand 6. The switch 10 is opened by being projected from the bottom of the concave 7 by the pushing force of a spring when the handset 1 is not set in the concave 7, and is closed by being retracted thereinto by the weight of the handset 1 when the handset 1 is set in the concave 7.

Figure 5:
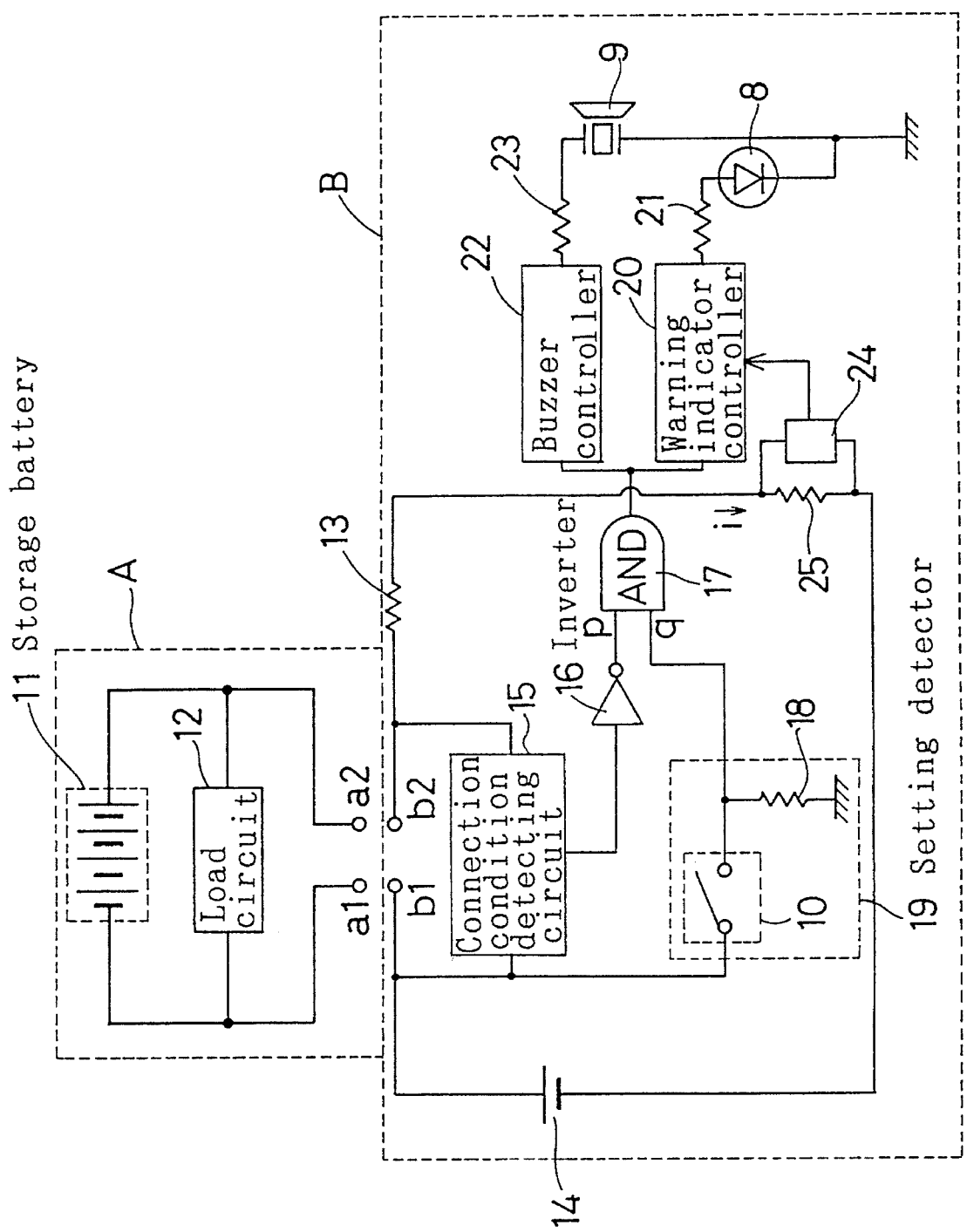
FIG. 5 a circuit diagram showing an electrical arrangement of the cordless telephone set embodying the present invention.

FIG. 5 shows an electrical arrangement of the cordless telephone set provided with the above-described structure. Reference character A represents a circuit provided in the handset 1, and reference character B represents a circuit provided in the charging stand 6. Between the contacts a1 and a2 of the handset circuit A are connected a storage battery 11 incorporated in the handset 1 and a load circuit 12 indicating circuit elements provided in the handset 1. In this embodiment, a storage battery of a type where current continues to flow after the battery is completely charged is used as the storage battery 11.

Between the contacts b1 and b2 of the charging stand circuit B are connected a resistor 13 and a direct current (DC) power source 14. When the handset 1 is set in the concave 7 of the charging stand 6, if the contacts a1 and b1 and the contacts a2 and b2 are connected correctly, a closed loop of from the power source 14 through the storage battery 11 and the resistor 13 to the power source 14 is formed, so that a charging current flows into the storage battery 11. For simplicity, the DC current source 14, which is a circuit for converting a commercial alternating current into a direct current, is represented as a battery.

Between the contacts b1 and b2 of the charging stand 6 is also connected a connection condition detecting circuit 15 which detects whether the contacts a1 and b1 and the contacts a2 and b2 are electrically connected or not (in other words, whether the contacts a2 and b2 are electrically connected or not). The output of the connection condition detecting circuit 15 is of high level when the contacts a1 and b1 and the contacts a2 and b2 are correctly connected, that is, when charging of the storage battery 11 is possible. The output is of low level when the handset 1 is not set in the concave 7 of the charging stand 6 or when the handset 1 is set in the concave 7 in incorrect form, for example, inclining, or when the contacts a1 and b1 and the contacts a2 and b2 are not connected in normal condition since the whole or a part of the contacts a1, a2, b1 and b2 is rusty.

The output of the connection condition detecting circuit 15 is inverted by an inverter 16 and inputted to an input terminal p of an AND circuit 17 serving as a charging detecting means. The above-described switch 10 is arranged between an input terminal q of the AND circuit 17 and a line passing through the contacts b1 and b2 and the power source 14. When the switch 10 is closed by setting the handset 1 in the concave 7 of the charging stand 6 as described above, a high level output from the power source 14 is provided to the input terminal q of the AND circuit 17.

Reference numeral 18 represents a grounding resistor arranged between ground and a line between the switch 10 and the input terminal q of the AND circuit 17. The grounding resistor 18 provides a low level output to the input terminal q of the AND circuit 17 when the switch 10 is opened. The grounding resistor 18 and the switch 10 constitute a setting detector 19.

The AND circuit 17 obtains a logical product of the inverted output of the connection condition detecting circuit 15 and an output of the setting detector 19. The output signal of the AND circuit 17 is processed by a warning indicator controller 20, and supplied through a resistor 21 to the indicator 8 and through a buzzer controller 22 and a resistor 23 to the warning buzzer 9.

Reference numeral 24 represents a voltage detecting circuit provided at need, which detects a voltage across a resistor 25 arranged on the line passing the power source 14 and the contacts b1 and b2 and supplied the detection output to the indicator controller 20.

Since, when the storage battery 11 is being charged, a current i flowing through the line is decreased as the battery 11 approaches to a completely charged condition, whether the charging of the battery 11 is being performed or completed is detected by detecting the current value of the current i. The voltage detecting circuit 24 compares the value of the current i with a predetermined value, and generates a signal, which is of high level when the value of the current i is larger than the predetermined value and is of low level when it is smaller.

The indicator controller 20 controls the indicator 8 so as to blink when the output of the AND circuit 17 is of low level and the output of the voltage detecting circuit 24 is of high level and controls it to be continuously on when the output of the AND circuit 17 is of low level and the output of the voltage detecting circuit 24 is of low level. When the output of the AND circuit 17 is of high level, the controller 20 maintains the indicator 8 to be off.

In the circuit of the above-described arrangement, when the handset 1 is not set in the concave 7 of the charging stand 6, such as when a telephone call is being made or when the telephone set is being cleaned, since the contacts a1 and b1 and the contacts a2 and b2 are not electrically connected, the closed loop is not formed, so that the handset circuit A is driven by the storage battery 11. In the charging stand circuit B, the output of the connection condition detection circuit 15 is of low level, and an inverted output thereof, that is, a high level signal is outputted to the input terminal q of the AND circuit 17.

Moreover, since the switch 10 is opened, the potential at the setting detector 19 is of ground level, that is, of low level. In this case, the logical product output of the AND circuit 17 is of low level since the input to the AND circuit is of high level on the side of the connection condition detecting circuit 15 and is of low level on the side of the setting detector 19. Under this condition, the indicator controller 20 controls the indicator 8 to be off, and the buzzer controller 22 maintains the warning buzzer 9 to be disabled.

When the user finishes a telephone call and sets the handset 1 in the concave 7 of the charging stand 6, if the handset 1 is correctly set, the contacts a1 and b1 and the contacts a2 and b2 are electrically connected to start the charging of the storage battery 11, so that the output of the connection condition detecting circuit 15 is of high level and a low level signal is outputted to the input terminal p of the AND circuit 17.

Moreover, the potential at the setting detector 19 is of high level since the switch 10 is closed by the weight of the handset 1. In this case, the logical product output of the AND circuit 17 is of low level since the input to the AND circuit 17 is of low level on the side of the connection condition detecting circuit 15 and is of high level on the side of the setting detector 19. Under this condition, the warning buzzer 9 remains off. The indicator 8 blinks until the charging of the storage battery 11 is completed and is continuously on after the completion of the charging.

When although the handset 1 is set in the concave 7 of the charging stand 6, the handset 1 is slightly inclining and the contacts a1 and b1 and the contacts a2 and b2 are mechanically separated or when although the contacts a1 and b1 and the contacts a2 and b2 are in contact with each other in a correct manner, they are electrically disconnected since they are rusty, the charging of the storage battery 11 is impossible since the contacts a1 and b1 and the contacts a2 and b2 are electrically disconnected. In this case, the output of the connection condition detecting circuit 15 is of low level, and an inverted output thereof, that is, a high level signal is outputted to the input terminal q of the AND circuit 17.

However, the potential of the setting detector 19 is of high level since the switch 10 is closed by the weight of the handset 1. Consequently, the input to the AND circuit 17 is of high level both on the side of the connection condition detecting circuit 15 and on the side of the setting detector 19, and the logical product output of the AND circuit 17 is of high level, so that the warning buzzer 9 generates a warning sound to attract the user's attention. In this case, as described above, the indicator 8 is turned off by the control by the indicator controller 20.

While in this embodiment, the charging apparatus is of stand type and the handset 1 is set in the charging stand 6, the present invention may be embodied in cordless telephone sets of other types such as a cordless telephone set of wall type where the charging apparatus is of wall type and the handset 1 provided with a hook is hung on a set portion of the charging apparatus.

As described above, according to the present invention, since a function is provided to detect whether the telephone apparatus is set in a predetermined position of the charging apparatus or not and since only when the telephone apparatus is set, the connection condition detecting means detects that the battery is not being charged, warning is provided only when it is necessary. Consequently, when the telephone apparatus is set in the charging apparatus, if the setting condition is improper and charging is impossible, warning is provided to attract the user's attention, thereby preventing unexpected accidents such as the abrupt interruption of a telephone call due to the voltage decrease of the storage battery.

Moreover, when the contacts for charging have become rusty due to oxidation and are not connected correctly, warning is provided to notify the user of the condition. As the conductivity of the contacts is easily restored by removing the rust with a simple mending tool such as sandpaper, the warning provided according to the present invention is very useful.

The appearances of some cordless telephone sets are of configurations not very suitable for setting the cordless handset therein since too much emphasis is placed on functionality and novelty. With the present invention, however, even in the cordless telephone sets of such configurations, it is possible to notify the user of the improper setting of the handset.

Obviously, many modifications and variations of the present invention are possible in light of the above teachings. It is therefore to be understood that within the scope of the appended claims, the invention may be practiced other than as specifically described.

What is claimed is:

1. A cordless telephone set comprising:

a cordless telephone apparatus having a storage battery and a first contact to which the storage battery is connected;

a charging apparatus having a portion for setting the cordless telephone apparatus, said charging apparatus charging the storage battery of the cordless telephone apparatus set in the portion;

a second contact provided at the setting portion so as to correspond to the first contact of the cordless telephone apparatus;

setting detecting means provided at the setting portion for detecting whether the cordless telephone apparatus is set in the setting portion or not;

connection condition detecting means for detecting whether the first contact and the second contact are electrically connected or not;

charging detecting means for detecting whether the storage battery is being charged or not based on a detection output of the setting detection means and a detection output of the connection condition detecting means;

a circuit for outputting a warning signal when a signal representing that the storage battery is not being charged is outputted from the charging detecting means under a condition where the cordless telephone apparatus is set in the setting portion; and warning providing means for providing a warning based on the warning signal.

2. A cordless telephone set according to claim 1, wherein said charging apparatus functions as a stand for setting the cordless telephone apparatus.

3. A cordless telephone set according to claim 2, wherein said setting portion is a concave which admits a bottom of the cordless telephone apparatus.

4. A cordless telephone set according to claim 3, wherein said setting detecting means includes a switch which projects from and retracts into the concave.

5. A cordless telephone set according to claim 1, wherein said warning providing means is a buzzer.

6. A cordless telephone set according to claim 1, wherein said warning providing means is a warning indicating lamp.

7. A cordless telephone set according to claim 1, further comprising:

charging condition detecting means for detecting whether charging is being performed or completed by sensing a value of a charging current;

charging condition displaying means; and controlling means for causing the charging condition displaying means to provide different displays between when charging is being performed and when charging is completed based on an output of the charging condition detecting means.

8. A cordless telephone set according to claim 7, wherein said charging condition displaying means blinks when charging is being performed, and is continuously on when charging is completed.

9. A cordless telephone set where a storage battery incorporated in a cordless telephone apparatus is charged by setting the cordless telephone apparatus in a predetermined portion of a charging apparatus, wherein said cordless telephone apparatus comprising a pair of first contacts connected to two electrodes of the storage battery and said charging apparatus comprises:

a pair of second contacts corresponding to the pair of first contacts so as to come into contact with the pair of the first contacts, said second contacts being connected to a power source;

a connection condition detecting circuit connected between the pair of the second contacts for detecting whether the pair of the second contacts are electrically connected or not;

a setting detecting switch connected to one of the second contacts, said setting detecting switch being driven by the cordless telephone apparatus when the cordless telephone apparatus is set in the charging apparatus;

a logic circuit for generating a predetermined output when the cordless telephone apparatus is set and the second contacts are not electrically connected based on an output of the connection condition detecting circuit and an output of the setting detecting switch; and a warning indicator driven based on an output of the logic circuit.

* * * * *